United States Patent [19]

Hagn et al.

[11] 4,439,013
[45] Mar. 27, 1984

[54] MOTOR VEHICLE PROVIDED WITH AN ADDITIONAL MIRROR EMBRACING THE DEAD ANGLE

[75] Inventors: Bruno Hagn, Munich; Werner Neuhauser, Coburg; Robert Wimmer, Oberlaufing, all of Fed. Rep. of Germany

[73] Assignee: Bayerische Motoren Werke Aktiengesellschaft, Munich, Fed. Rep. of Germany

[21] Appl. No.: 279,991
[22] PCT Filed: Oct. 29, 1980
[86] PCT No.: PCT/EP80/00120
  § 371 Date: Jun. 30, 1981
  § 102(e) Date: Jun. 30, 1981
[87] PCT Pub. No.: WO81/01269
  PCT Pub. Date: May 14, 1981

[30] Foreign Application Priority Data

Oct. 31, 1979 [DE] Fed. Rep. of Germany ....... 2943941

[51] Int. Cl.³ .............................................. B60R 1/08
[52] U.S. Cl. .................................... 350/307; 98/2.04; 350/584

[58] Field of Search ...................... 350/584, 307; 98/2, 98/2.04, 87, 92, 93

[56] References Cited

U.S. PATENT DOCUMENTS 3,859,899 1/1975 Mills ................................ 350/302 X
4,109,562 8/1978 MacDonald ........................ 98/92 X
4,139,269 2/1979 Backenköhler ................. 350/307 X

FOREIGN PATENT DOCUMENTS 2017093 10/1971 Fed. Rep. of Germany ...... 350/584
2704226 8/1978 Fed. Rep. of Germany ...... 350/307

Primary Examiner—F. L. Evans
Attorney, Agent, or Firm—Craig & Burns

[57] ABSTRACT

An automobile with a mirror arrangement comprising a supplementary mirror disposed in the forward zone of the interior of the automobile adjacent to a side window pane for embracing the dead angle of an associated outside rear view mirror disposed on the automobile as disclosed. The supplementary mirror is disposed in a housing that presents a perforation that is adjacent an air delivery passage of a heating and ventilating system of the automobile, as well as an air outlet device directed to the side window pane.

1 Claim, 2 Drawing Figures

MOTOR VEHICLE PROVIDED WITH AN ADDITIONAL MIRROR EMBRACING THE DEAD ANGLE

The invention relates to an automobile with a mirror arrangement comprising a supplementary mirror disposed in the forward zone of the interior of the automobile adjacent to a side window panel for embracing the dead angle of an associated outside rear view mirror disposed on the automobile.

Such a mirror arrangement is known from German OS No. 27 26 543. Here the additional mirror is borne in a housing that is disposed immediately adjacent to the pane of the side window. This known arrangement has the drawback that with ventilation of the pane of the side window effected in a known way via air discharge openings in the vehicle dashboard, the area of the side window pane that is essential for seeing the outside rearview mirror is not adequately ventilated because the flow of air is shielded by the additional mirror or the housing.

The invention is concerned with the problem of improving the ventilation of the side window pane in the area that is essential for seeing the outside mirror, in an automobile with a mirror arrangement of the aforementioned type.

This problem is solved according to the present invention by providing that the supplementary mirror is disposed in a housing that presents a perforation that is adjacent an air delivery passage of a heating and ventilating system of the automobile, as well as an air outlet device directed to the side window pane.

With the invention, the essential area for seeing the outside rearview mirror is acceptably ventilated on the inside of the side window pane and thereby a fogging of this area is avoided.

According to a preferred disclosed embodiment of the present invention the housing is disposed on a side door of the automobile, and particularly on a cover that is taken out via a side door fitting, in the forward region of the door, with the housing being connected on the one hand with an air outlet opening of the air delivery passage in the region of a door hinge of the side door, with introduction therebetween of an elastic element, and on the other hand it presents an air outlet slot between an edge of the supplemental mirror that is turned toward the side window pane and a housing wall adjacent thereto. With this arrangement a stylistically suitable configuration is attained that is moreover simple in construction. According to a further feature of the present invention the housing is subdivided by a partition into a chamber that guides the air and a chamber that receives the supplementary mirror. With such a configuration all the delivered air is deflected so as to be targeted on the side window pane without burdening the passengers by air flowing out via other edge zones of the supplementary mirror.

These and other objects, features and advantages of the present invention will become more apparent from the following description when taken in connection with the accompanying drawings which shows, for purposes of illustration only, one embodiment in accordance with the present invention, and wherein:

FIG. 1 shows a housing for an additional mirror on the inside of a vehicle door, shown in perspective FIG. 2 is a section along line II—II of FIG. 1.

DETAILED DESCRIPTION OF THE DRAWINGS

Figure 1:
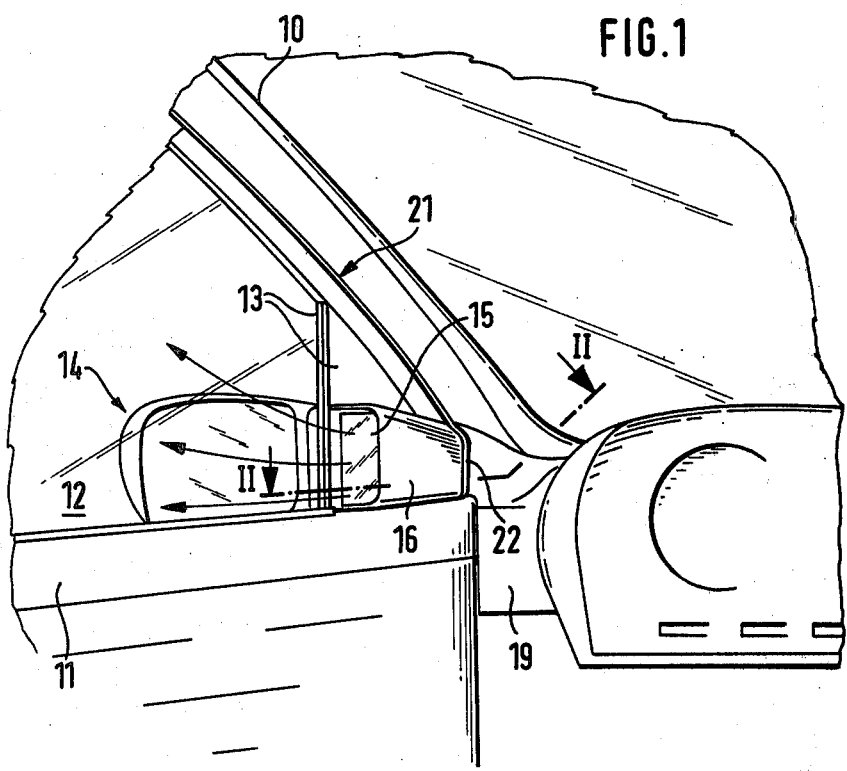
Figure 2:
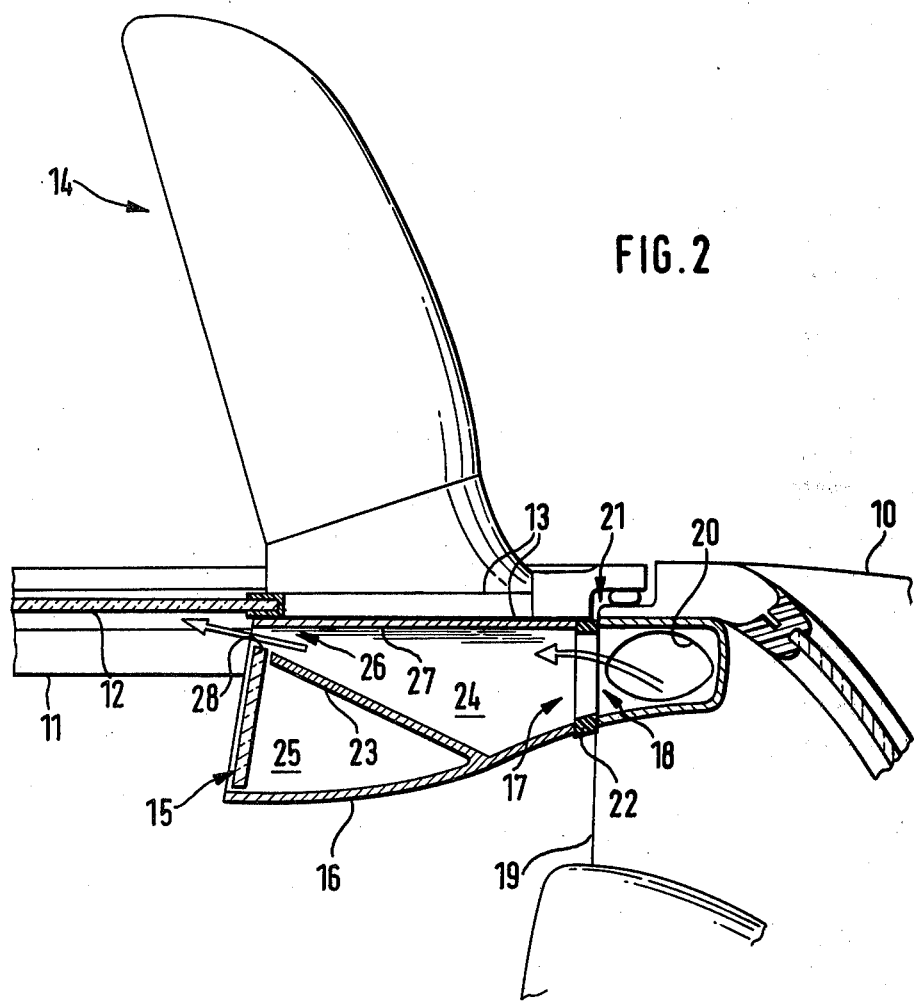

FIG. 1 shows a side door 11 of a passenger car 10 that is shown in no further detail, with a side window pane 12. Side door 11 has a cover 13 that is taken out via the side door fitting in the forward zone of the door in connection with the side pane 12. As FIG. 2 shows, on the outside of side door 11 there is an outside rearview mirror 14 disposed on cover 13. More or less opposite the outside rearview mirror 14, in the forward zone of the inner space of the vehicle, there is a supplementary mirror 15 disposed on the inside of side door 11.

Supplementary mirror 15 for embracing the dead angle is borne adjustably in housing 16. Housing 16 is disposed on cover 13. In its end that is away from supplementary mirror 15, housing 16 presents a perforation 17. The perforation is connected with an air outlet opening 18 of an air delivery passage 20 of a heating and ventilating system of automobile 10. The opening 18 is disposed in a dashboard 19, in the region of door hinge 21. Perforation 17 of housing 16 is connected via an elastic element 22, such as a packing ring or a bellows, with air outlet opening 18.

The interior of housing 16 is divided by a partition 23, into an air guiding chamber 24 and a chamber 25 that receives supplementary mirror 15. Partition 23 ends before supplementary mirror 15. Its edge 28 that is turned toward the side window pane 12 as well as housing wall 27 adjacent to edge 28 of the mirror define an air outlet slot 26. Air led into chamber 24 of housing 16 via air delivery passage 20 flows via air outlet slot 26 first into the area that is essential for seeing the outside rearview mirror.

With the housing 16 of the configuration according to the invention, for receiving supplementary mirror 15, there is an elongation of the air passage 20 that ends in dashboard 19, for ventilating air for the side window pane 12 that requires little outlay for construction and that is stylistically appropriate. There is also the substantial advantage that the ventilation of the side window pane 12 is target to begin in an area essential for seeing through to the outside rearview window 14. Thereby in this region of the side window pane 12 on the inside of the automobile fogging is rapidly removed, or prevented.

While We have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle comprising a heating and venting system having an air-outlet opening in the dashboard and a mirror arrangement having an additional mirror that includes the blind angle, said additional mirror being disposed in the front area of a side door adjacent to the inside of a side window pane for cooperation with an outside rear-view mirror disposed on the outside of the side door, said additional mirror being held in a separate housing disposed on a covering in the front area of the door, the housing is subdivided inside by a separating wall into a first chamber, receiving the additional mirror and a second chamber serving as an air-guiding duct, an elastic element connecting one end of the air-guiding duct to the air-outlet opening of the heating and venting system, the other end of the air-guiding duct is connected with an air-outflow gap formed between the additional mirror and the side window pane whereby said air-outflow gap acts as a defroster nozzle for directing air from said heating and venting system to clear said side window pane.

* * * * *